(12) United States Patent
Pellenc et al.

(10) Patent No.: US 10,681,873 B2
(45) Date of Patent: Jun. 16, 2020

(54) DEVICE FOR HOLDING A PIVOTING CUTTING BLADE

(71) Applicant: PELLENC (Societe Anonyme), Pertuis (FR)

(72) Inventors: Roger Pellenc, Pertuis (FR); Philippe Gilbert, Le Puy Sainte Reparade (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 91 days.

(21) Appl. No.: 15/541,902

(22) PCT Filed: Mar. 17, 2016

(86) PCT No.: PCT/FR2016/050598
§ 371 (c)(1),
(2) Date: Aug. 14, 2017

(87) PCT Pub. No.: WO2016/156695
PCT Pub. Date: Oct. 6, 2016

(65) Prior Publication Data
US 2018/0000015 A1 Jan. 4, 2018

Related U.S. Application Data

(60) Provisional application No. PCT/FR2016/050598, filed on Mar. 17, 2016.

(30) Foreign Application Priority Data

Apr. 1, 2015 (FR) .................................... 15 00655

(51) Int. Cl.
*A01G 3/02* (2006.01)
*A01G 3/037* (2006.01)
*A01G 3/053* (2006.01)

(52) U.S. Cl.
CPC ............. *A01G 3/021* (2013.01); *A01G 3/037* (2013.01); *A01G 3/053* (2013.01)

(58) Field of Classification Search
CPC ........ A01G 3/021; A01G 3/037; A01G 3/053; F16B 39/108
(Continued)

(56) References Cited

U.S. PATENT DOCUMENTS 643,539 A * 2/1900 Rowe ...................... B26B 13/00
30/256
1,894,631 A * 1/1933 Owen ................... F16B 39/108
411/144

(Continued)

FOREIGN PATENT DOCUMENTS

FR 2614568 A1 11/1988
FR 2978010 A3 1/2013
(Continued)

OTHER PUBLICATIONS

International Search Report for corresponding International Application No. PCT/FR2016/050598.

*Primary Examiner* — Andrea L Wellington
*Assistant Examiner* — Liang Dong
(74) *Attorney, Agent, or Firm* — Egbert Law Offices, PLLC (57) ABSTRACT

A device for holding a cutting blade having a cam, including a blade pivot pin for mounting the cutting blade in a pivoting manner on a cutting tool, and a cam pivot pin connected to a driving mechanism of the blade, a first pivot pin chosen from the blade pivot pin and the cam pivot pin being provided with a matching-shape axial lock. The other pivot pin is provided with a manually tightened axial lock. The device includes a catch having a first end with a latch able to be engaged with and held on the first pivot pin by matching shapes, and a second end able to be engaged with
(Continued)

and held on the pivot pin provided with the manually tightened axial lock.

9 Claims, 3 Drawing Sheets

(58) Field of Classification Search
USPC ... 30/29, 428, 146, 341, 228, 251, 266–268; 411/121–123
See application file for complete search history.

(56) References Cited

U.S. PATENT DOCUMENTS

| | | | | |
|---|---|---|---|---|
| 3,262,201 | A * | 7/1966 | Docken | B23D 29/005 |
| | | | | 30/240 |
| 3,834,020 | A * | 9/1974 | Caire | A01G 3/033 |
| | | | | 30/228 |
| 4,648,464 | A * | 3/1987 | Huxley | A01B 1/065 |
| | | | | 172/36 |
| 6,829,829 | B1 * | 12/2004 | Huang | A01G 3/0475 |
| | | | | 30/193 |
| 8,327,549 | B2 * | 12/2012 | Huang | B26B 13/26 |
| | | | | 30/190 |

FOREIGN PATENT DOCUMENTS

| | | |
|---|---|---|
| JP | H0657136 U | 8/1994 |
| JP | H08103165 A | 4/1996 |

\* cited by examiner

DEVICE FOR HOLDING A PIVOTING CUTTING BLADE

TECHNICAL FIELD

The present invention concerns a device for holding a pivoting cutting blade. It also concerns a cutting tool equipped with such a device. The invention relates in a general manner to the field of cutting heads of hand tools. This involves primarily plant cutting tools, for example pruning shears, or electric hedge cutters. The invention finds applications also for hand-operated cutting tools.

STATE OF PRIOR ART

The state of the art is described with reference to electric pruning shears. The technical problems encountered in the state of the art are however not limited to pruning shears, be they manual or power-assisted, such as hydraulic or pneumatic pruning shears, and may occur with other similar tools, such as metal shears for example, exerting a cutting action through the intermediary of a pivoting cutting blade.

There exist in this field a great number of tools that are equipped with cutting heads with a pivoting blade. This is the case particularly for electric pruning shears described in documents FR2614568 or FR2935175. These electric pruning shears present a general structure in the form of a housing integrating an electric motor, a cutting head and a transmission connecting the motor to the cutting head. The term "transmission" designates here the assembly of parts transmitting the motion of the motor to the cutting head. In the case of electric pruning shears of the documents mentioned above the cutting head comprises a mobile cutting blade and a fixed counter-blade, the latter being usually called an "anvil". The cutting blade is mounted on a main pivoting axis and can pivot between an open position and a closed position on the anvil. The cutting blade also features a blade tail mounted on a secondary pivot axis thereby connecting it to the afore-mentioned transmission. The tail of the cutting blade forms a cam that is used for making the blade pivot. In effect, the action exerted by the transmission at the secondary pivoting axis produces a lever action which makes it possible to pivot the cutting blade around the main pivot axis. In the following description, and for the sake of simplification, the tail of the cutting blade will be simply called a "cam".

The main pivot axis features a shoulder on the side of the anvil and threading on its opposite end which receives a locknut. The locknut may possibly be associated with a washer for checking the play on the side of the cutting blade. The locknut allows tightening of the cutting blade on the anvil by incorporating a clamping adjustment. The clamping adjustment can be controlled if applicable by the play adjustment washer, so as to achieve cuts of high quality. This play adjustment washer may present at its periphery a knurling for easy manipulation when adjusting the play.

The secondary pivot axis features a shoulder at its first end and a groove for accepting a plastic retainer ring or "clip" at its other end. The secondary pivot axis associated with the retaining "clip" provides the link between the transmission and the cam of the cutting blade. The retaining "clip", together with the shoulder blocks the translation of the secondary pivot axis.

When changing the blade, the recommended method consists of positioning the blade at mid-opening before turning the pruning shear off and disconnecting it. Different tools are then necessary and in particular a screwdriver to remove an inspection cover giving access to the secondary pivot axis, [and] nippers or a specific tool to remove the retaining "clip" as well as a wrench that is appropriate for loosening and then completely unscrewing the locknut from the principal pivot axis. The play check washer and the two pivot axes are then removed to free the cutting blade of the cutting head. These operations are then reproduced in the reverse order to mount a new cutting blade.

Thus, during a blade change, numerous tools are necessary and the operator must really be attentive and thorough at every moment to handle and have available the various parts. This operation is even more delicate when it must be performed in the field outdoors, most often in the middle of winter, the time when plants are pruned such as vines and fruit trees. Experience shows that operators often forget their tools and lose parts when removing a blade in the open field. These constraints tend to dissuade the operators from performing blade changes in the field and they cause belated returns of tools to the workshop.

At the time of adjustment of the tightness play between the cutting blade and the anvil, a wrench is also needed to loosen or retighten the locknut in order to increase or decrease the tightness play between the blade and the anvil. This operation is frequently performed in the field and cannot be done without a tool.

DISCLOSURE OF THE INVENTION

The invention proposes a cutting tool that includes a cutting head with a cutting blade, an anvil and a holding device for said cutting blade that does not present the afore-mentioned difficulties.

One aim of the invention is especially to propose a blade holding device which allows a change of the cutting, blade of the cutting head without any tool.

Another aim of the invention is to propose a blade holding device that is adapted to a rapid blade change in the field, in particular for tools such as pruning shears used for pruning plants.

Another aim of the invention is to propose a blade holding device that prevents the use of small-size parts that are difficult to handle and likely to get lost during a disassembly.

Finally, one aim of the invention is to propose a reliable holding device, with no risk of becoming loose which enables, when called for, quick and tool-free modification of the tightness play between the cutting blade and the anvil.

To achieve these goals, the invention proposes a holding device for a cam cutting blade, comprising a blade pivot for the pivoting assembly of the blade around the blade pivot axis on a cutting tool, and a cam pivot linked to a drive mechanism of the blade. A first pivot, chosen between the blade pivot and the cam pivot is equipped with an axial positive-fit lock. According to the invention the other pivot is equipped with manually tightened axial lock. Furthermore, the holding device includes a latch presenting a first end with a sliding bolt to be engaged on the first pivot by a positive fit to form said axial lock. The latch presents a second end which gets engaged and maintained on the pivot provided with the axial, hand-tightened lock.

The positive fit between the sliding bolt and the first pivot makes sure to prevent an axial displacement of the sliding bolt and thus of the latch, relative to the first pivot. In this way the sliding bolt forms with the first pivot the axial positive lock. It is kept engaged with the first pivot when the second end of the latch is engaged on the pivot provided with the hand-tightened axial lock. The second end of the latch is essentially retained by tightening by means of the hand-tightened axial lock to prevent its axial displacement. The hand-tightened axial lock can also be put to good use for preventing a lateral displacement of the latch.

A pivoting cutting blade means a blade capable of pivoting, around the blade pivot axis, between an "open" position and a "closed" position. The open position allows engaging [plant] material to be cut between the blade and the anvil. In the closed position the blade is lowered onto the anvil. During the pivoting motion between the open and the closed position the material to be cut, for example a vine runner, is cut off. The counter-blade may be pivoting or fixed. It consists, for example, of a fixed counter-blade such as the "anvil" mentioned in reference to the description of the state of the art.

A cam blade means a blade provided with a cam which links it to an operating mechanism. It is a motorized or manual operating mechanism enabling the pivoting of the blade between the open and the closed position. The cam may be of a single piece with the blade or may be a part that is added to the blade. When it is an added part, the cam may also be mounted in pivoting fashion around the blade pivot axis and be integral in motion with the blade through the intermediary of a fixed tenon, for example. Preferably, the cam is made of a single piece with the blade, thereby reducing the number of parts of the cutting head. This is the case particularly when the cam is formed by the tail of the cutting blade of a pruning shear.

The operating mechanism of the blade may feature a transmission as described in reference to the state of prior art, with a reducer and a ball screw-nut associated with rocker bars linked to the cam. The mechanism may also feature a handgrip to be operated by the user of the tool.

The operating mechanism or the rocker bars of this mechanism, are linked to the cam by a cam pivot. It is, for example, a shoulder pivot, or a pivot one end of which is force-fitted on the cam or on the operating mechanism.

The pivot cam, just like the blade pivot is provided with an axial lock. By axial lock is meant a releasable mechanism preventing or limiting a relative axial movement between the pivot and the articulated parts on the pivot. The axial movement is here understood to be a movement along the pivot axis.

One of the axial locks, for example the axial lock of the cam pivot, is a positive-fitting lock. The other axial lock, for example the axial lock of the blade pivot, is a hand-tightened axial lock.

By hand-tightened axial lock one must understand a lock that is configured to be tightened by hand against the parts to be maintained, without requiring the use of a tightening tool. The clamping is preferably done by a thread turning motion. A cam clamping mechanism or a mixed clamping mechanism, by cam and thread turning, may also be envisaged. In the case of clamping by thread turning, the lock may feature a nut placed on the threading of the pivot. The manual clamping lock may notably be provided with an element facilitating its grip or its operation by the user's hand. It is, for example, a knurled nut, a wing nut (butterfly nut) or also an operating lever of a clamping cam. Of course, the hand-tightened axial lock is also configured to be loosened by hand, without the need for a loosening tool.

As indicated above, the main function of the hand-tightened axial lock is to prevent the relative axial movement between the pivot and the articulated parts thereon. It involves, for instance, an axial displacement of the blade on the blade pivot, and in relation to the counter-blade. It may also concern a relative axial displacement between the operating mechanism, such as rocker bars, connected to the cam, the can itself, and the cam pivot.

When the hand-tightened axial lock is present on the blade pivot, it may also have an adjustment function of the clamping play between the blade and the counter-blade. The blade pivot is thus integral in rotation with the cutting blade in order to avoid any unintentional loosening of an axial clamping lock by relative movement with the cutting blade during its operation. The hand-tightened axial lock may be associated with a play-adjusting washer, placed at the end of the pivot between the blade and the hand-tightened axial lock, for example.

As indicated above, the positive-fit axial lock uses a sliding bolt integral with the latch, which engages with the pivot due to its complementary shape when the latch is put in place and when the second end of the latch is engaged on the pivot provided with a hand-tightened axial lock. The sliding bolt may be in the form of a rail, a groove, a tenon, a key, a fork and more generally of any mechanical part of a shape adjusted to a positively receiving part in the vicinity of the end of the pivot. The form-fit between the pivot in the vicinity of its end and the sliding bolt results in the mechanical lock which prevents or at least limits the axial displacement between the pivot and the parts it maintains in place.

In a particular implementation of the axial lock with positive fit this lock may be provided with a groove made in the vicinity of the end of the corresponding pivot. In this case the sliding bolt may be formed by an edge of a punched out opening in the first end of the latch.

To facilitate locking such an axial lock, the opening may present a first portion sufficiently large for the pivot to pass and a second narrower portion, in communication with the first portion of the opening and adjusted on the bottom of the pivot groove. The latch is then configured to engage the second portion of the opening in the groove when the second end of the latch is engaged on the other pivot provided with the hand-tightened axial lock.

The second end of the latch may feature, for example, a fork, a flange, a ring or simply an opening with a diameter adapted to the pivot provided with the hand-tightened axial lock. When it includes a ring or an opening engaged on the pivot, the pivot prevents its lateral displacement. Axial displacement of the latch on the pivot is prevented by the hand-tightened axial lock. This same lock may also serve to prevent the lateral displacement. Rotation of the second end of the latch around its pivot can remain free.

The hand-tightened axial lock may be associated to a play-adjusting washer.

In order to securely hold the cutting blade with a checked tightness play with the counter-blade, the hand-tightened axial lock may include a nut and a nut-blocking device.

The nut-blocking device may be integral with the tool body. However, it is preferably a blocking device integral with the latch. It becomes engaged with the nut in order to prevent its rotation, particularly when the latch is correctly engaged on the blade and cam pivots.

To make not only tightening but also removal of the screw easier, the blocking device of the nut may be provided with a temporary release mechanism.

In a particular implementation of the hand-tightened axial lock it may feature a knurled or notched nut.

The blocking device may include a flexible blade connected to the latch and provided with at least one spur in a free end. In a resting position of the flexible blade, the spur is in contact with a knurling or notching of the nut and prevents the rotation of the nut. In a released position, likely to be held under the bending constraint exerted by a user's finger, the spur is at a distance from the knurling or notching, and does not hinder the rotation of the nut.

The invention also concerns a cutting tool comprising a pivoting cutting blade, mounted on a blade pivot, and comprising an operating mechanism of the cutting blade connected to a cam of the cutting blade through the intermediary of a cam pivot. In conformance with the invention, maintenance of the cutting blade is ensured by a holding device as described above.

Other characteristics and advantages of the invention become clear from the description below, in reference to the figures of the attached drawings. This description applies to a motorized pruning shear. It is meant to be purely illustrative and non-limiting.

DETAILED DESCRIPTION OF IMPLEMENTATION OF THE INVENTION

Identical or similar portions of the various figures are marked with the same reference numbers so that is possible to refer from one figure to the next.

Figure 1:
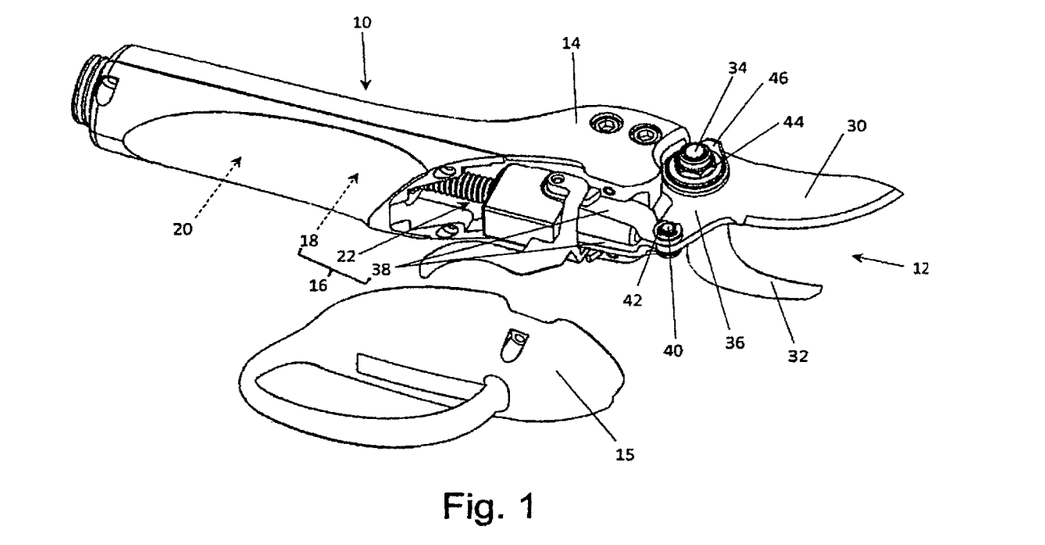
FIG. 1 is a perspective view of a cutting head of an electric pruning shear of a known type.

FIG. 1 presents a cutting head 12 of a pruning shear 10 of a known type. The pruning shear 10 includes a housing 14, integrating an electric motor 20 concealed by the housing 14, a cutting head 12, and a transmission 16. The transmission connects the motor to the cutting head 12. The term "transmission" designates here the assembly of parts transmitting the motion of the motor to the cutting head. The transmission 16 may feature a reducer 18 mounted on the output shaft of an electric motor 20, and a ball screw-nut mechanism 22 driven by the reducer, and rocker bars 38 described below. On FIG. 1 the motor and the reducer are concealed by the housing 14. A cover 15 providing access to the transmission has been removed so as to show the ball screw-nut mechanism 22. The ball screw-nut mechanism 22 consists of a screw and a nut which cooperate mutually through the intermediary of balls circulating in a ball raceway. The raceway is formed by complementary threads of the nut and the screw. The rotational movement of the screw thus results in a translation of the nut along the screw and parallel to the screw axis. The direction of travel of the nut is dependent on the sense of rotation of the screw. The translation movement of the nut is used to drive the cutting head 12. The cutting head 12 includes a pivoting cutting blade 30 and a fixed counter blade 32, also called "anvil". The cutting blade 30 is mounted on a blade pivot 34 and can thus pivot between an open position and a closed position on the anvil 32. The cutting blade 30 also features a cam 36 of one piece with the blade. The cam is linked to the screw of the ball screw-nut mechanism 22 through the intermediary of the rocker bars 38. The rocker bars 38 are articulated on the cam around a cam pivot 40. More precisely, one rocker bar is provided on each side of the cam.

The action exerted by the transmission on the cam 36, through the intermediary of the cam pivot 40, allows the cutting blade 30 to pivot around the blade pivot 34. The cam pivot 40 is, in the example of FIG. 1, a clevis pin. The shoulder is placed against the rocker bar turned towards the anvil 32. The shoulder serves as a stop limiting the axial translation in the linkage of the rocker bars 38 with the cam 36. One may note here that the shoulder could just as well be located against the rocker bar opposite from the anvil.

The second end of the pivot cam 40 features a groove. After installing the cam pivot in the cam and the rocker bars, an elastic ring or "clip" is placed in the groove. The combined effect of the shoulder and the "clip" thus blocks any unintentional refraction of the cam pivot. The elastic ring or clip constitutes, together with the groove of the cam pivot 40, an axial lock with positive fit.

The blade pivot 34, too, is a clevis pin of the side of the anvil. Its second end is threaded to receive a forcing nut 44, here a locknut. The blade pivot 34 receives also, on the side of the cutting blade 30, a play-adjusting washer 46.

The play-adjusting washer 46 is more precisely intended to check the tightening play of the blade. In the type of cutting head such as represented in FIG. 1, warping is expected of the cutting zone as shown in FIG. 1 between the blade and the counter-blade forming the "anvil" in order to ensure a cut with a scissors effect to obtain a fine cut. In the open or the closed position of the cutting blade, there is no play between the cutting blade and the anvil at the blade pivot 34. Rotation of the play-adjusting washer is then difficult or even impossible by action of a finger on the periphery of the washer. By contrast, in the half-way position between the open and the closed position, warping of the cutting zone generates some play at the blade pivot 34. This play is perceptible by easy rotation of the play-adjusting washer around the pivot.

To adjust the tightness it is recommended to position the blade at half-open and to tighten the nut until effort is required to turn the play-adjusting washer around the pivot. Said washer thus serves as a marker and check in the adjustment of play. In this manner, the operator can finely adjust the play in the tightness by playing on the ease of rotation of the washer around the pivot when the nut is tightened. In example 1, the play-adjusting washer presents over a portion of its periphery a knurling intended to ease its manipulation during the adjustment of the tightness play, said knurled portion being oriented so that its manipulation by one finger of the operator's hand is easily performed.

Disassembly of the pivoting blade 30 of the pruning shear requires the following operations:
  position the blade at mid-opening before turning the pruning shear off and unplugging it.
  using a screwdriver remove an inspection cover on the housing offering access to the cam pivot 40.
  remove the "clip" 42 using a specific tool.
  loosen and unscrew the tightening nut 44 using a specific wrench.
  Manually remove the play-adjusting washer 46 and the two pivots 34, 40 to release the blade 30.

Besides the fact that these operations require tooling, they also demand precision with respect to the size of certain parts such as the "clip" 42, or even the fastening screws for the inspection cover on the housing. As mentioned before, these constraints make the blade change operation difficult or even impossible, in the open field, for example in a vineyard during a pruning day in winter.

Figure 2:
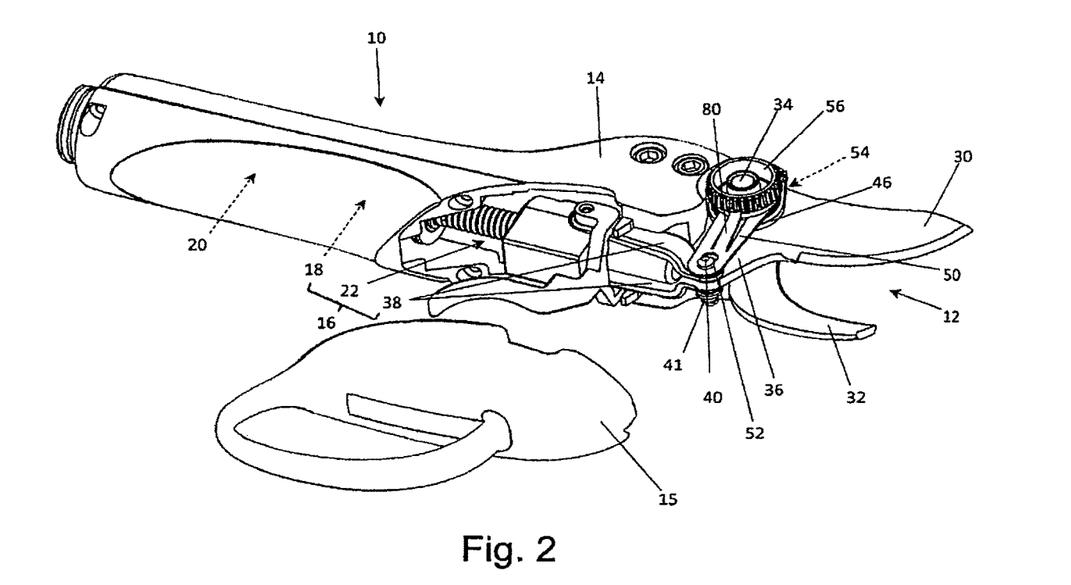
FIG. 2 is a perspective view of a cutting head of an electric pruning shear in conformance with the invention.

FIG. 2 shows a pruning shear provided with a blade holding device according to the invention and facilitating the blade change. The pruning shear of FIG. 2 presents a certain number of parts or portions similar or identical to the pruning shear of FIG. 1, and marked with the same reference numbers. For the sake of simplification the description of these portions is not repeated here, knowing that one can refer to FIG. 1.

On FIG. 2 a cover piece 15 giving access to a portion of the transmission 16 is shown in the removed position. When the cover piece is in place on the housing 10, it is fastened by a fitting mechanism or a hinge and fitting mechanism (not shown). It can also be fastened here by means of flexible pins, by knurled screws or by any other appropriate fastening means capable of being engaged and removed without a tool.

FIG. 2 shows the presence of a latch 50 which links the cam pivot 40 to the blade pivot 34. The latch 50, or at least a first end 52 of the latch, forms together with the end of the cam pivot 40, a form-fitting axial lock. The latch cooperates in effect with the end of the cam pivot 40 in order to prevent or at least limit an axial movement of the cam pivot relative to the cam 36 and relative to the rocker bars 38.

The axial movement of the pivot cam is also limited on its opposite end by a shoulder 41 such as described in reference to FIG. 1. In other implementations not shown, for example when a single rocker bar is used, the cam pivot can be press-fitted on the cam or on the rocker bar and not be provided with a shoulder Contrary to the "clip" 42 of FIG. 1 which is maintained on the cam pivot by elastic deformation, the latch 50 is primarily maintained through the intermediary of its second end 54. The latter is in fact retained on the blade pivot by damping. The engagement of the latch on the cam pivot is explained in more detail in the description below.

It can also be seen in FIG. 2 that the tightening nut 44 of FIG. 1 can be replaced by a knurled clamping nut 56 which gets placed on the threaded end of the blade pivot. The main advantage of a knurled nut as compared to the hexagonal nut visible on FIG. 1 is that it does not require a tool for tightening, the knurling allowing an easy manual grip of the nut for exerting an effort of tightening or loosening. Another function of the knurling on the nut is described in reference to the following figures.

The knurled nut forms h the threaded end of the blade pivot a manually tightened axial lock.

Figure 3:
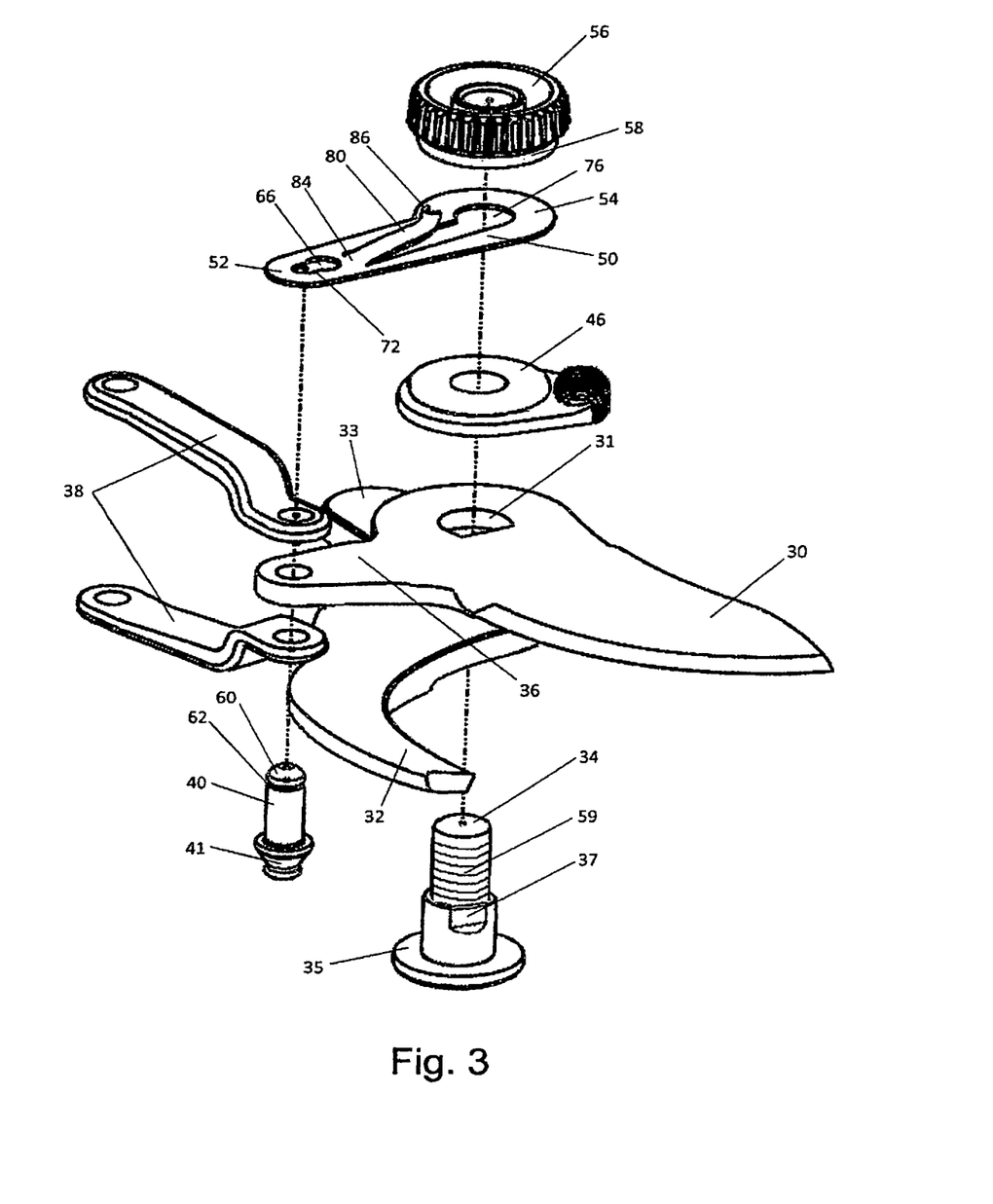
FIG. 3 is an exploded view at a larger scale and in perspective of a holding device for the blade in conformance with the invention, fitting out the pruning shear of FIG. 2.

FIG. 3 shows at a larger scale various components of the blade holding device according to the invention. On FIG. 3 the blade pivot 34 is removed from the cutting blade 30 and the counter-blade 32. This makes it easier to distinguish a shoulder 35 of the blade pivot 34 which comes to rest on the face of the counter-blade 32 opposite of the cutting blade 30. It can also be seen that the free end of the blade pivot presents a threading 59. This threading is adapted to the knurled tightening nut 56. The pivot gets seated in a through-hole 31 of the cutting blade 30 and of the counter-blade 32. Fastening of the cutting head formed by the cutting blade 30 and the counter-blade 32 on the tool body is obtained through the intermediary of a fastening tab 33 of the counter-blade. A flat or relief 37 is made axially on the spindle of the blade pivot 34. It cooperates with a mating profile of the through-hole of the cutting blade 30, and permits making the blade pivot 34 and the cutting blade 30 integral in rotation. This measure promotes the blocking of the knurled tightening nut 56 described elsewhere, the adjustment of the tightness play between the blade and the counter-blade and avoids any loosening of the blade pivot in the knurled clamping nut 56 under the effect of the movement of the cutting blade under repeated cutting efforts.

FIG. 3 also represents the cam pivot 40 at a larger scale. Particularly visible is a shoulder 41 of the cam pivot which rests on one of the rocker bars 38. As FIG. 3 shows, the end of the pivot forming the shoulder 41 is shaped for gripping the pivot by hand. It constitutes a small gripping appendix of the pivot and contributes to making the blade change operation easy and tool-free, while reducing the risk of losing any of the parts. The cam pivot passes through through-holes of a first rocker bar 38, of the cam 36, then of a second rocker bar 38, from the shoulder 41 on up.

FIG. 3 shows that the end of the cam pivot 40 also passes through an opening 66 made in the first end 52 of the latch 50, and adapted to the diameter of the pivot. A chamfer 60 at the free end of the cam pivot is made to facilitate its passage through the opening 66.

FIG. 3 also shows that the cam pivot 40 is provided with a groove 62 in the vicinity of its end. Now, the opening 66 of the latch 50 presents a narrowed portion adjusted to the diameter of the cam pivot 40 at the bottom of the groove. This narrowed portion is delimited by an edge 72 acting as slide bolt which engages in the groove 62 of the cam pivot when the latch 50 is pushed in the direction of the through-hole 31 of the blade pivot 34.

The second end 54 of the latch also presents an opening 76 dimensioned for the passage of the blade pivot. The latch is so dimensioned that the edge 72 of the opening 66 at the first end 52 of the latch is completely engaged in the groove 62 of the cam pivot when the opening 76 of the second end 54 matches up with the through-hole 31 of the cutting blade 30 and of the counter-blade 32. The latch 50 is maintained in this position as soon as the blade pivot 34 is engaged through the opening 76 of the second end 54.

The peripheral edge 72 of the opening of the first end 52 of the latch constitutes a sliding bolt which cooperates with the groove 62 of the cam pivot to form an axial lock by positive fit. This lock limits or prevents an axial movement of the cam pivot 40 relative to the rocker bars 38 and relative to the cam 36 of the cutting blade 30.

It can also be seen on FIG. 3 that the latch 50 does not come into direct contact with the cutting blade 30 but rests on a play-adjusting washer 46. The play-adjusting washer 46 is provided for checking a tightness play in the manner described in reference to FIG. 1.

Figure 4:
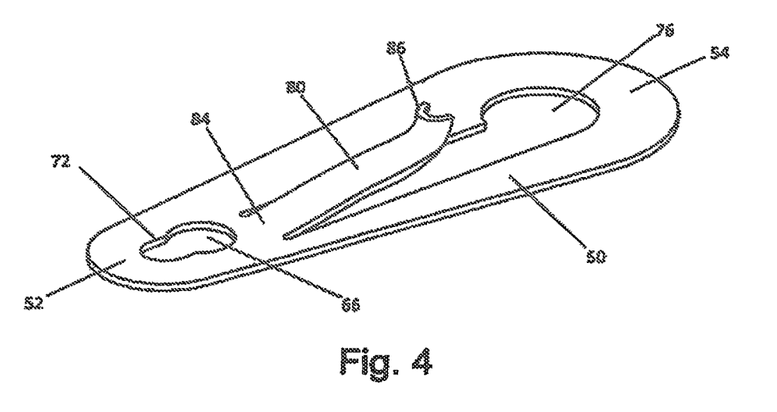
FIG. 4 is a perspective view f a locking latch of the holding device of the blade.

FIG. 4 shows at a larger scale the latch 50 used for locking the earn pivot. Visible is the opening 66 made in the vicinity of the first end 52 of the latch for the passage of the cam pivot and the opening 76 made in the vicinity of the second end 54 of the latch for the passage of the blade pivot 34. The opening 76 of the second end of the latch is essentially round. It presents an edge forming a sort of thrust washer opposite the bearing surface of the knurled nut (not shown).

One can see that the opening 66 of the first end 52 of the latch presents a narrowed portion. As indicated above, it is fitted on the bottom of the groove of the cam pivot (not shown). The edge of the opening in this narrowed portion constitutes the slide bolt of the lock.

Also noticeable on FIG. 4 is the presence, on the latch 50, of a flexible blade $0 connected to the body of the latch 50 by one of its ends 84. The opposite end of the flexible blade 80 is free. It is provided with a spur 86. The flexible blade 80 or at east its end 84 connected to the body of the latch 50 gives it sufficient elasticity to be bent by pressure exerted by a user's finger. The bending of the blade 89 allows modifying the height of the spur, relative to the edge of the opening 76 of the second end 54 of the latch 50.

The latch as presented in FIG. 4 is preferably a metallic piece. It may be shaped by stamping. Its length, and more exactly the distance separating the sliding bolt 72 in its first end and the opening 76 in its second end, is fixed based on a distance separating the blade pivot and the cam pivot. This latter distance is also fixed by the corresponding through-holes of the cutting blade.

Figure 5:
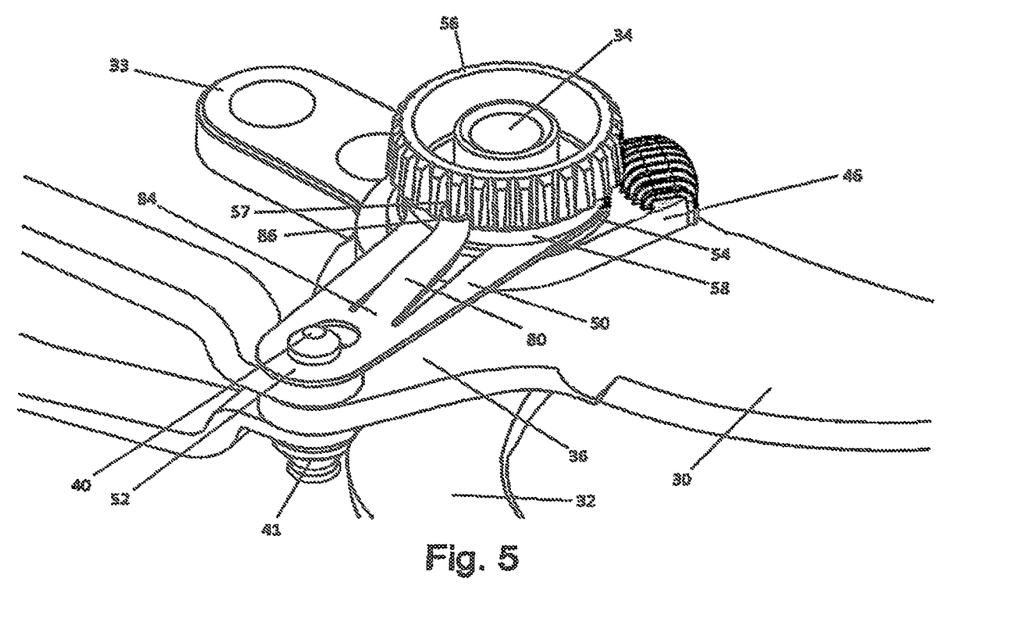
FIG. 5 is a perspective view of a portion of the blade holding device of FIG. 3 illustrating the operation of a nut-blocking device.

The flexible blade 80 and the spur 86 form a blocking and retaining device for the knurled tightening nut 56 as shown in FIG. 5.

FIG. 5 shows the holding device of a cutting blade of FIG. 5 in a configuration where the blade has been installed. The blade pivot 34 is engaged in the counter-blade 32, the cutting blade 30, and the play-adjusting washer 46. The knurled clamping nut 56 is screwed on the blade pivot. The first end 52 of the latch 50 is engaged on the cam pivot 40 and the second end 54 of the latch is clamped between the knurled clamping nut 56 and the play-adjusting washer 46. It is to be noted here that the thickness of the play-adjusting washer corresponds essentially to the thickness of the rocker bar 38 on the blade side so that the latch 50 is positioned essentially in parallel to the face of the cutting blade. The basis of the latch 50 is in this case part of a plane. Other shapes of the latch are however conceivable, for example, in case the play-adjusting washer is absent or for other configurations of the cutting head. For example the latch may have a shape that is adapted so its end 54 can come into contact directly with the cutting blade. The play-adjusting washer or any similar device may thus be placed between the latch and the clamping nut.

It can be observed that the length of the flexible blade 80 of the latch 50 is such that the spur 86 reaches the knurled clamping nut 66. The flexible blade 80 is shown in a position of rest in which the spur becomes engaged on a relief 57 of the knurling of the clamping nut 56. The blade and the spur thus inhibit the rotation of the nut and prevent its accidental loosening.

When the user applies pressure on the flexible blade 80 in the direction of the cutting blade 30 the blade will occupy a position of release in which the spur finds itself disengaged from the knurling relief. The knurled clamping screw 56 presents in effect, over a portion of its height, a peripheral edge 58 without knurling and withdrawn from said knurling. This edge is turned towards the latch 50.

The flexibility of the flexible blade 80 and the peripheral edge 58 with no knurling constitute a releasing mechanism of the blocking of the knurled clamping nut 56. It is activated to release the nut during its installation, during its removal or during an adjustment of the tightness.

FIG. 5 also affords a better view of the fastening tab 33 of the counter-blade 32. It presents through-holes for fastening screws. It should be stressed that the fastening screws, not shown, never need to be removed for changing the cutting blade 30.

Thanks to the device of the invention the assembly and disassembly of the cutting blade are greatly facilitated and can be done entirely by hand. It comprises:
    installation of the first end of the latch on the cam pivot,
    an easy slide of the latch to engage the sliding bolt on the cam pivot to match up the opening of the second end of the latch with the through-hole of the blade pivot, while releasing the blockage device of the knurled clamping nut,
    installation of the blade pivot and the tightening of the knurled clamping nut on this pivot.
    releasing the blocking device of the clamping nut, thus preventing the relative rotation of the clamping nut in relation to the cutting blade, and thus setting the tightness play between the cutting blade and the counter-blade.

The invention claimed is:

1. An apparatus comprising:
    a cutting blade having a first through hole formed therein, said cutting blade having a surface extending outwardly therefrom, the surface having a second through hole formed therein and offset from said first through hole, the surface being integral with said cutting blade;
    a counter blade cooperative with said cutting blade so as to provide a cutting action, said counter blade having a third through hole formed therein, said through hole being aligned with said first through hole;
    a first pivot member extending along a first pivoting axis through the first through hole of said cutting blade and the third through hole of said counter blade;
    a second pivot member extending through the second through hole of the surface;
    a drive mechanism secured to said cutting blade via said second pivot member, said drive mechanism having a motor that drives the second pivot member in a pivoting motion around the first pivoting axis so as to cause a pivoting motion of said cutting blade around the first pivoting axis and provide a cutting action;
    a latch plate having a first opening at one end thereof and a second opening at an opposite end thereof, said second pivot member received in said first opening, said first pivot member received in said second opening, said latch plate engaging said second pivot member and forming an axial lock with said second pivot member; and
    a lock member rotatably secured to an end of said first pivot member so as to manually clamp said cutting blade and said latch member and said counter blade together.

2. The apparatus of claim 1, said lock member being a clamping nut, said latch plate having a blocking element selectively engageable with said clamping nut so as to fix a rotational position of said clamping nut.

3. The apparatus of claim 2, said blocking element being integral with said latch plate.

4. The apparatus of claim 3, said blocking element being a flexible blade extending outwardly of a plane of said latch plate.

5. The apparatus of claim 2, said clamping nut having a knurled or notched surface.

6. The apparatus of claim 5, said latch plate having a flexible blade extending therefrom, said flexible blade having at least one spur at a free end of said flexible blade, said flexible blade having a resting position in which the at least one spur contacts the knurled or notched surface of said clamping nut, said flexible blade having a free position in which said flexible blade is bent away from the knurled or notched surface of said clamping nut.

7. The apparatus of claim 1, said second pivot member having a circumferential groove adjacent one end thereof, the first opening of said latch plate having an edge fitted to the circumferential groove of said second pivot member.

8. The apparatus of claim 7, the first opening of said latch plate having a first portion having an area greater than a transverse cross-sectional area of said second pivot member between the circumferential groove and the one end, said first opening of said latch plate having a second portion communicating with said first portion, said latch plate being slidable such that said second pivot member moves from the first portion to the second portion such that the second portion engages with the circumferential groove of said second pivot member.

9. The apparatus of claim 1, said first pivot member being manually clamped, said second pivot member being clamped in position by said latch plate.

* * * * *